United States Patent
Leppanen et al.

(10) Patent No.: US 12,124,672 B2
(45) Date of Patent: Oct. 22, 2024

(54) PLACING A SOUND WITHIN CONTENT

(71) Applicant: Nokia Technologies Oy, Espoo (FI)

(72) Inventors: Jussi Leppanen, Tampere (FI); Miikka Vilermo, Siuro (FI); Arto Lehtiniemi, Lempaala (FI)

(73) Assignee: Nokia Technologies Oy, Espoo (FI)

( * ) Notice: Subject to any disclaimer, the term of this patent is extended or adjusted under 35 U.S.C. 154(b) by 17 days.

(21) Appl. No.: 17/783,089

(22) PCT Filed: Nov. 12, 2020

(86) PCT No.: PCT/EP2020/081829
§ 371 (c)(1),
(2) Date: Jun. 7, 2022

(87) PCT Pub. No.: WO2021/115716
PCT Pub. Date: Jun. 17, 2021

(65) Prior Publication Data
US 2023/0014810 A1    Jan. 19, 2023

(30) Foreign Application Priority Data
Dec. 10, 2019   (GB) ...................................... 1918049

(51) Int. Cl.
*G06F 3/04815*    (2022.01)
*G06F 3/04817*    (2022.01)
(Continued)

(52) U.S. Cl.
CPC ...... *G06F 3/04815* (2013.01); *G06F 3/04817* (2013.01); *G06F 3/0486* (2013.01); *H04S 7/302* (2013.01)

(58) Field of Classification Search
CPC ............ G06F 3/04815; G06F 3/04817; G06F 3/0486; G06F 3/011; G06F 3/04847;
(Continued)

(56) References Cited

U.S. PATENT DOCUMENTS 8,704,070 B2 * 4/2014 Beaty ........................ G01H 3/00
84/654
9,343,053 B2 * 5/2016 Harel ........................ G10H 5/02
(Continued)

FOREIGN PATENT DOCUMENTS

EP          3 260 950 A1    12/2017
WO    WO 2019/141900 A1    7/2019

*Primary Examiner* — Haimei Jiang
(74) *Attorney, Agent, or Firm* — Harrington & Smith

(57) ABSTRACT

An apparatus including circuitry configured for: displaying content within a viewport; displaying a symbol representing a sound source within the viewport; detecting one or more gestures that place the displayed symbol in the displayed content; disambiguating between a first placement method, performed for the symbol, that locks the sound source to a position that moves with displayed content moving within the viewport and a second placement method performed for the symbol that is different to the first placement method and locks the sound source to a position that does not move with displayed content moving within the viewport, wherein the first placement method includes a disambiguating gesture relative to the viewport, for the symbol, indicating movement of the symbol relative to the viewport that disambiguates the first placement method from the second placement method.

19 Claims, 12 Drawing Sheets

(51) Int. Cl.
*G06F 3/0486* (2013.01)
*H04S 7/00* (2006.01)

(58) Field of Classification Search
CPC .... G06F 3/0488; G06F 3/04883; G06F 3/167;
G06F 3/0481; H04S 7/302; H04S
2400/11; H04S 7/30; H04S 7/40
See application file for complete search history.

(56) References Cited

U.S. PATENT DOCUMENTS

| | | | |
|---|---|---|---|
| 9,720,557 B2* | 8/2017 | Steinbach | G06F 3/0481 |
| 10,025,486 B2* | 7/2018 | Fein | G06F 3/017 |
| 10,684,754 B2* | 6/2020 | Lee | G06F 3/0484 |
| 11,320,983 B1* | 5/2022 | Boyers | G06F 3/04817 |
| 2012/0284297 A1* | 11/2012 | Aguera-Arcas | G06F 21/629 |
| | | | 713/1 |
| 2013/0033483 A1* | 2/2013 | Im | G06F 3/0482 |
| | | | 345/419 |
| 2013/0038490 A1* | 2/2013 | Garcia | G01S 13/74 |
| | | | 342/451 |
| 2015/0271618 A1* | 9/2015 | Kim | H04R 5/04 |
| | | | 381/17 |
| 2016/0054895 A1* | 2/2016 | Lee | G06V 40/176 |
| | | | 715/716 |
| 2017/0188176 A1* | 6/2017 | Jang | H04S 7/30 |
| 2018/0095635 A1* | 4/2018 | Valdivia | G02B 27/0093 |
| 2019/0121522 A1* | 4/2019 | Davis | G06V 40/28 |
| 2021/0191600 A1* | 6/2021 | Lemay | G06F 3/0485 |
| 2023/0040737 A1* | 2/2023 | Liu | G06V 20/20 |

* cited by examiner

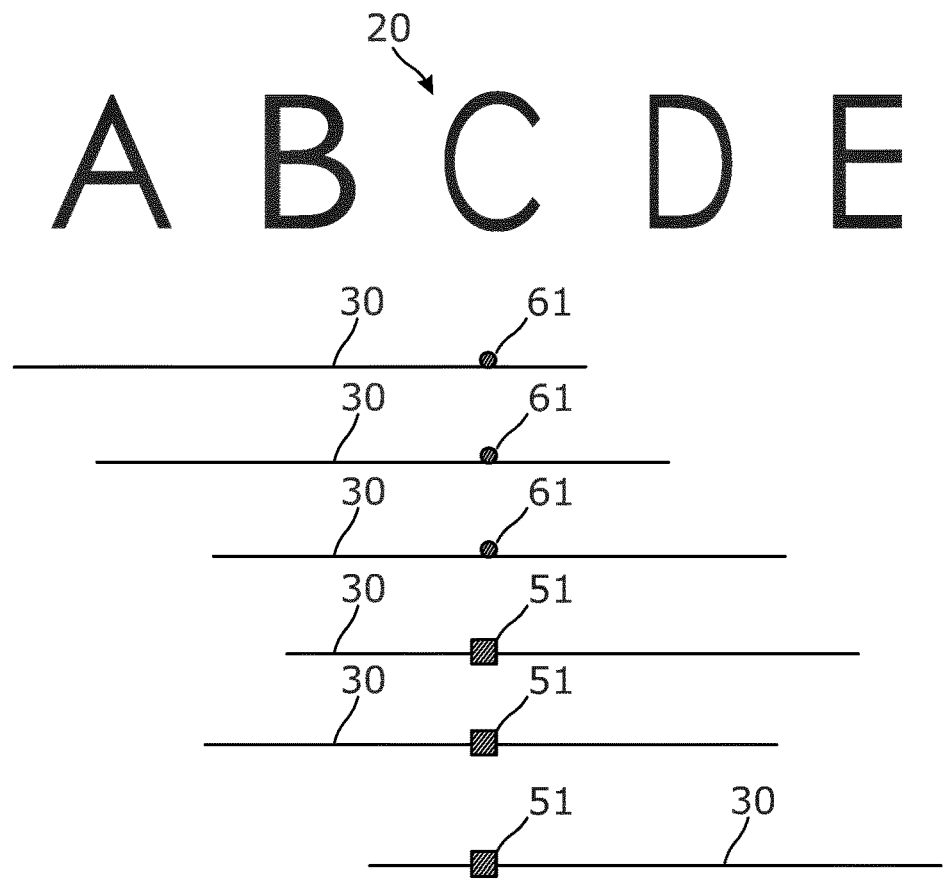
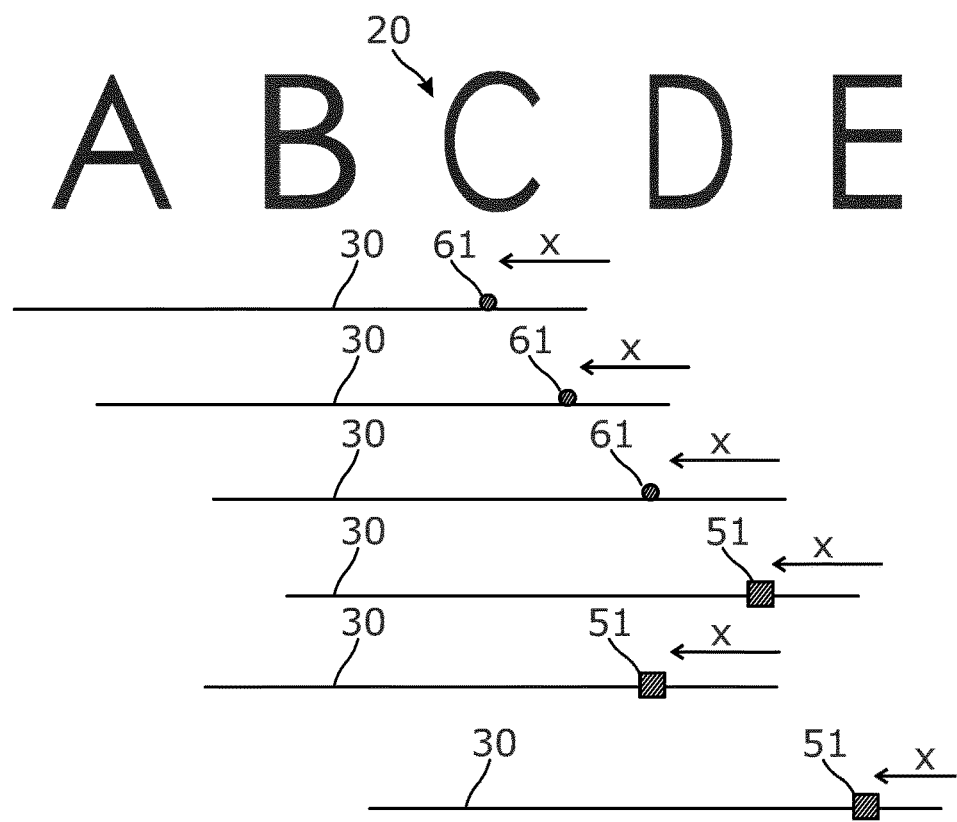

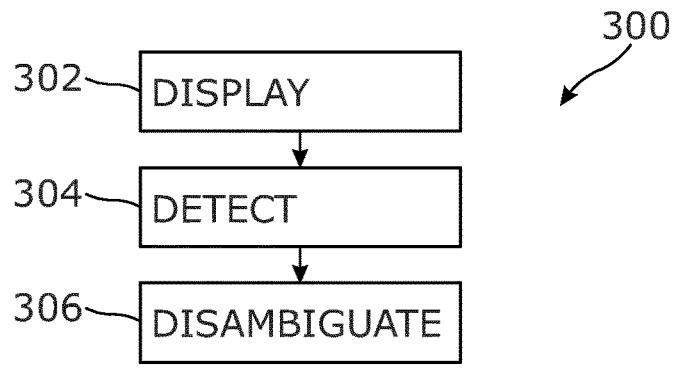
FIG. 14
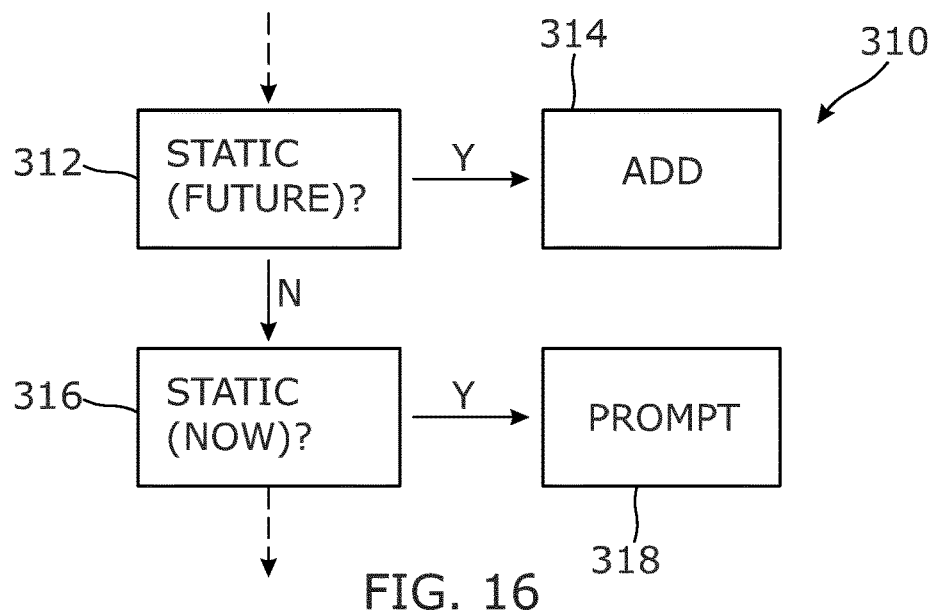
FIG. 16
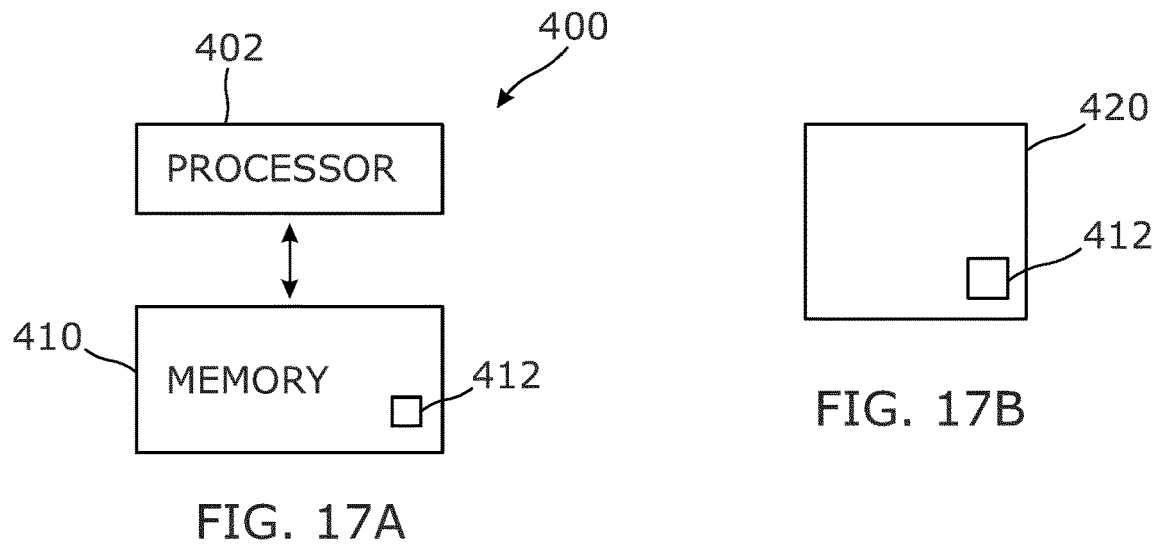
FIG. 17A
FIG. 17B

PLACING A SOUND WITHIN CONTENT

CROSS REFERENCE TO RELATED APPLICATION

This patent application is a U.S. National Stage application of International Patent Application Number PCT/EP2020/081829 filed Nov. 12, 2020, which is hereby incorporated by reference in its entirety, and claims priority to GB 1918049.6 filed Dec. 10, 2019.

TECHNOLOGICAL FIELD

Embodiments of the present disclosure relate to placing a sound within displayed content.

BACKGROUND

Spatial audio allows a user to control where a sound source is rendered from. In some circumstances it is desirable for a user to add an audio source to displayed content.

BRIEF SUMMARY

According to various, but not necessarily all, embodiments there is provided an apparatus comprising means for:
  displaying content within a viewport;
  displaying a symbol representing a sound source within the viewport;
  detecting one or more gestures that place the displayed symbol in the displayed content;
  disambiguating between a first placement method, performed for the symbol, that locks the sound source to a position that moves with displayed content moving within the viewport and a second placement method performed for the symbol that is different to the first placement method and locks the sound source to a position that does not move with displayed content moving within the viewport,
  wherein the first placement method comprises a disambiguating gesture relative to the viewport, for the symbol, indicating movement of the symbol relative to the viewport that disambiguates the first placement method from the second placement method.

In some but not necessarily all examples, the disambiguating gesture of the first placement method comprises dragging the symbol relative to the viewport In some but not necessarily all examples, the first placement method comprises a prior gesture, before the disambiguating gesture, dragging the symbol relative to the viewport and the displayed content.

In some but not necessarily all examples, the apparatus comprises means for:
  determining a first position in the viewport defined by an end-point of the prior gesture dragging the symbol relative to the viewport and the displayed content; and
  determining a second position in the viewport defined by termination of respective first placement method or the second placement method; wherein a difference between the first position and the second position disambiguates the first placement method and the second placement method.

In some but not necessarily all examples, the first placement method comprises a placement method in which the symbol is dragged to content and is then dragged with content and the second placement method comprises a placement method in which the symbol is dragged to a position within the viewport and is then held at the position within the viewport.

In some but not necessarily all examples, the first placement method and the second placement method comprise: selection of the symbol using a gesture.

In some but not necessarily all examples, the first placement method and the second placement method comprise an initial gesture for the symbol relative to the viewport and the displayed content indicating a movement of the symbol relative to the viewport and the displayed content,
  the first placement method additionally comprising:
  a gesture relative to the viewport, for the symbol, indicating movement of the symbol relative to the viewport that disambiguates the first placement method from the second placement method.

In some but not necessarily all examples, the first placement method comprises an initial drag movement of the symbol relative to the viewport and the displayed content and a subsequent movement of the symbol relative to the viewport but without movement of the symbol relative to the displayed content.

In some but not necessarily all examples, the first placement method comprises an initial drag movement of the symbol relative to the viewport and the displayed content and a subsequent movement of the symbol relative to the viewport to a variable position that tracks the displayed content that is moving within the viewport to which the sound source is to be locked.

In some but not necessarily all examples, the displayed content that is tracked and to which the sound source is to be locked is first content of a visual scene.

In some but not necessarily all examples, the first content is a majority of the visual scene that forms a background.

In some but not necessarily all examples, the first content is a minority of the visual scene being a visual object that moves within the visual scene.

In some but not necessarily all examples, the content displayed within the viewport is a sub-set of available content, wherein the sub-set is defined by the viewport, and wherein the viewport is defined by a point of view and a field of view, wherein one or both of the displayed content and the point of view are time-variable.

In some but not necessarily all examples, the first placement method comprises a holding gesture that holds the displayed symbol at a fixed position relative to the content while the viewport moves and wherein the second placement method comprises a holding gesture that holds the displayed symbol at a fixed position relative to the viewport while the viewport moves.

In some but not necessarily all examples, the second placement method performed on the symbol locks the sound source to a position that tracks with the viewport, not displayed content that is moving relative to the viewport.

In some but not necessarily all examples, the second placement method comprises an initial drag movement of the symbol relative to the viewport and the displayed content and no subsequent movement of the symbol relative to the viewport for a threshold time period.

In some but not necessarily all examples, the viewport is a touch display screen and the symbol is a displayed icon on the touch display screen and wherein the one or more gestures that place the displayed symbol in the displayed content are touch-based gestures.

In some but not necessarily all examples, the icon is provided in a menu displayed on the touch display screen.

In some but not necessarily all examples, the sound source and the content are recorded contemporaneously.

According to various, but not necessarily all, embodiments there is provided a method comprising:

displaying content within a viewport;

displaying a symbol representing a sound source within the viewport;

detecting one or more gestures that place the displayed symbol in the displayed content disambiguating between a first placement method, performed for the symbol, that locks the sound source to a position that moves with displayed content moving within the viewport and a second placement method performed for the symbol that is different to the first placement method and locks the sound source to a position that does not move with displayed content moving within the viewport, wherein the first placement method comprises a disambiguating gesture relative to the viewport, for the symbol, indicating movement of the symbol relative to the viewport that disambiguates the first placement method from the second placement method.

According to various, but not necessarily all, embodiments there is provided a computer program comprising program instructions for causing an apparatus to perform at least the following:

displaying content within a viewport;

displaying a symbol representing a sound source within the viewport;

detecting one or more gestures that place the displayed symbol in the displayed content;

disambiguating between a first placement method, performed for the symbol, that locks the sound source to a position that moves with displayed content moving within the viewport and a second placement method performed for the symbol that is different to the first placement method and locks the sound source to a position that does not move with displayed content moving within the viewport, wherein the first placement method comprises a disambiguating gesture relative to the viewport, for the symbol, indicating movement of the symbol relative to the viewport that disambiguates the first placement method from the second placement method.

According to various, but not necessarily all, embodiments there is provided a man-machine interface comprising means for:

displaying content within a viewport;

displaying a symbol representing a sound source within the viewport;

detecting one or more gestures that place the displayed symbol in the displayed content;

disambiguating between a first placement method, performed for the symbol, that locks the sound source to a position that moves with displayed content moving within the viewport and a second placement method performed for the symbol that is different to the first placement method and locks the sound source to a position that does not move with displayed content moving within the viewport, wherein the first placement method comprises a disambiguating gesture relative to the viewport, for the symbol, indicating movement of the symbol relative to the viewport that disambiguates the first placement method from the second placement method.

According to various, but not necessarily all, embodiments there is provided examples as claimed in the appended claims.

BRIEF DESCRIPTION

Some example embodiments will now be described with reference to the accompanying drawings in which:

FIG. 4 shows another example embodiment of the subject matter described herein;

FIG. 5 shows another example embodiment of the subject matter described herein;

FIG. 14 shows another example embodiment of the subject matter described herein;

FIG. 16 shows another example embodiment of the subject matter described herein;

FIG. 17 shows another example embodiment of the subject matter described herein.

DETAILED DESCRIPTION

Figure 1:
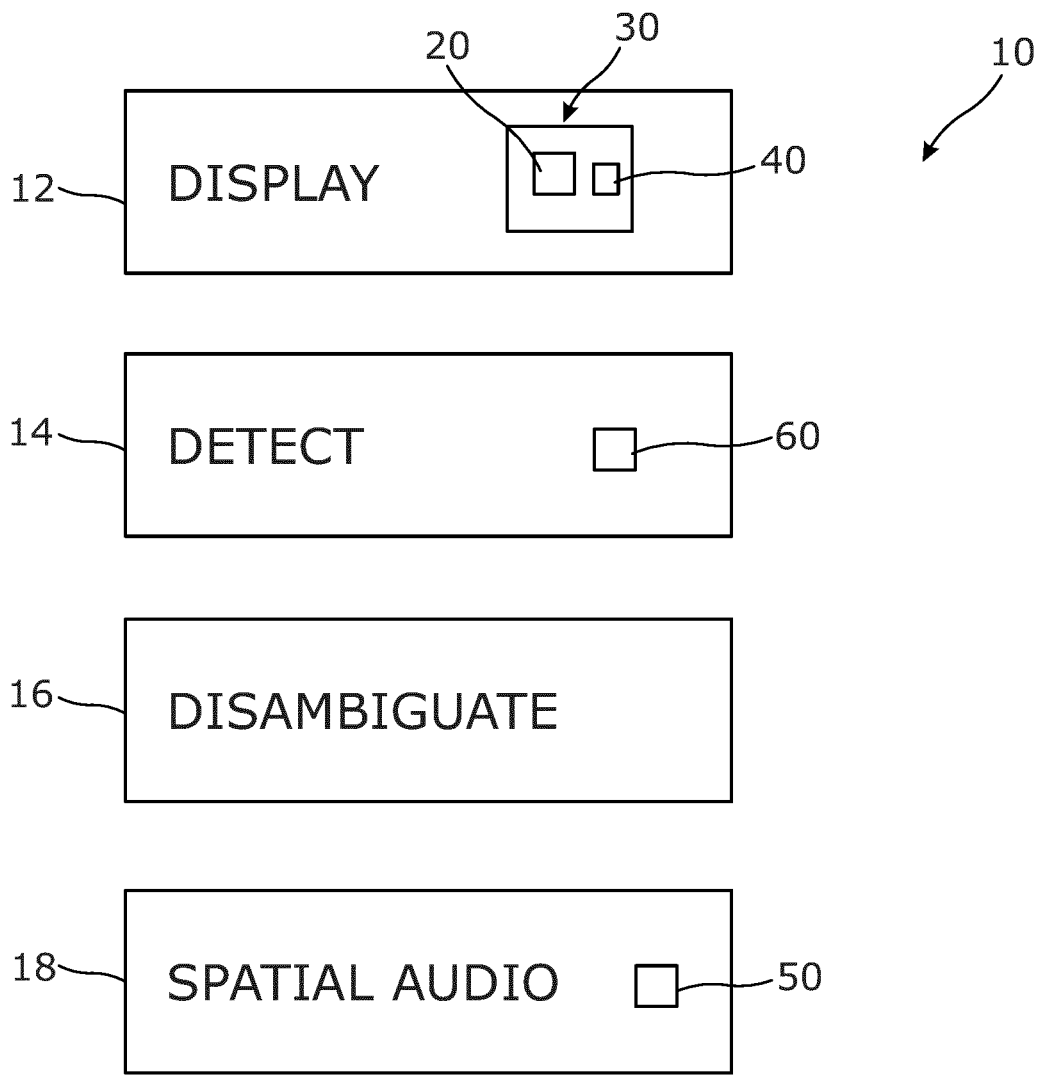
FIG. 1 shows an example embodiment of the subject matter described herein.

FIG. 1 illustrates an example of an apparatus 10 for controlling an addition of a sound source 50 to displayed content 20.

The apparatus 10 comprises means for:

displaying content 20 within a viewport 30;

displaying a symbol 40 representing a sound source 50 within the viewport 30;

detecting one or more gestures 60 that place the displayed symbol 40 in the displayed content 20;

disambiguating between a first placement method, performed for the symbol 40, that locks the sound source 50 to a position that moves with displayed content 20 moving within the viewport 30 and a second placement method performed for the symbol 40 that is different to the first placement method and locks the sound source 50 to a position that does not move with displayed content 20 moving within the viewport 30.

The first placement method comprises a gesture 60 relative to the viewport 30, for the symbol 40, indicating movement of the symbol 40 relative to the viewport 30 that disambiguates the first placement method from the second placement method.

In the example illustrated, the apparatus 10 comprises display means 12 for displaying content 20 within a viewport 30 and for displaying a symbol 40 representing a sound source 50 within the viewport 30;

detecting means 14 for detecting one or more gestures 60 that place the displayed symbol 40 in the displayed content 20;

disambiguating means 16 for disambiguating between a first placement method, performed for the symbol 40 and a second placement method performed for the symbol 40; and spatial audio means 18 configured to lock the sound source 50 to a position that moves with displayed content 20 moving within the viewport 30 (content-locked) or lock the sound source 50 to a position that does not move with displayed content 20 moving within the viewport 30, in dependence upon the disambiguation.

The first placement method comprises a gesture 60 relative to the viewport 30, for the symbol 40, indicating movement of the symbol 40 relative to the viewport 30 that disambiguates the first placement method from the second placement method.

The display means 12 can be any device for controlling or providing a visual output to a user. In some but not necessarily all examples, the apparatus 10 is a hand-portable apparatus and the display means 12 is a display screen of the apparatus 10. In some but not necessarily all examples, the display means 12 projects light into the eye of the user, for example via a near eye display or a head-mounted display screen or is an output interface for controlling the projection of light into the eye of the user or the head-mounted display screen.

The detecting means 14 can be any device for detecting one or more gestures 60. A gesture can be any movement of the user body. In some examples, the one or more gestures are touch gestures in which a user touches a touch sensitive screen, for example a touch sensitive display screen, using a finger of pointing device. In some examples, the one or more gestures are three dimensional gestures in which a user moves his or her body relative to the apparatus 10. Three-dimensional gestures can be detected in a variety of ways, for example, using multiple detectors to detect spatial variations in projected electric fields, ultrasound fields, or light fields.

Spatial audio means 18 is any device capable of controlling a perceived position of a sound source when rendered to a user. The sound source can be modelled as a virtual loudspeaker that is positioned by controlling, for example, timing and amplitude differences between the sound as perceived at a user's left ear and right ear. Reverberation can also be used to externalise the sound outside of a user wearing headphones. The sound can be rendered using a suitable multi-loudspeaker set-up such as a surround sound loudspeaker or using headphones.

The viewport 30 is the display area visible to a user. Where the apparatus 10 uses a display screen as display means 12, the viewport 30 is the display screen.

The displayed content 20 is what is displayed in the display area. In some, but not necessarily all examples, the content is video content. In some, but not necessarily all examples, the content displayed in the viewport 30 at a particular time is a sub-set of the content that is available to be displayed in the viewport 30 at a particular time. For example, the field of view of available content can be greater than a field of view of displayed content. This can for example occur if the viewport displays only part of a panoramic image or if the viewport 30 display mediated reality content. In first-person-perspective mediated reality, the user's real point of view (location and/or orientation) determines the point of view within a virtual space of a virtual user, changing a virtual scene (the displayed content). In some examples, the virtual space may extend horizontally up to 360° and may extend vertically up to 180°.

In some, but not necessarily all examples, the sound source 50 and the content are recorded contemporaneously.

The apparatus 10 in some examples is configured to enable adding of spatial audio effects (the sound source 50) to captured content, for example captured videos.

The displayed content can, in some examples, have associated sound that is rendered when the content is displayed.

In some but not necessarily all examples, the apparatus 10 is a rendering apparatus. It can for example, be used for editing the content to add spatial audio effects.

FIG. 2A to 2G illustrate an example of a viewport 30. Content 20 is displayed within the viewport 30. The content 20 is moving within the viewport 30. In these examples but not necessarily all examples, the content is stationary in FIGS. 2A & 2B, then it moves to the left (relative to the viewport 30) in FIGS. 2C, 2D, 2E, then it moves to the right (relative to the viewport 30) in FIG. 2F, then it moves to the left (relative to the viewport 30) in FIG. 2G. The FIGS. 2A to 2G are used to illustrate an example of the first placement method 101.

Figure 2A:
FIG. 2 shows another example embodiment of the subject matter described herein.

In FIG. 2A, a symbol 40 representing a sound source 50 is displayed within the viewport 30. A user 70 performs a selection gesture 60 for the symbol 40.

Figure 2B:
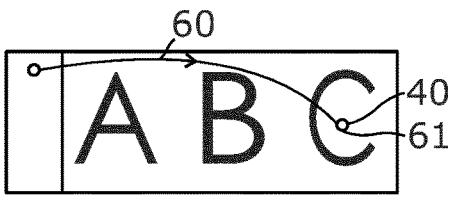

FIG. 2B illustrates a user 70 performing a placement gesture 60. This gesture 60 is relative to the viewport 30 and the displayed content 20 and indicates a movement of the symbol 40 relative to the viewport 30 and the displayed content 20.

For example, the placement gesture 60 can be a drag movement of the symbol 40 relative to the viewport 30 and the displayed content 20 to a symbol position 61 in the viewport 30 (and the displayed content 20).

Figure 2C:
Figure 2D:
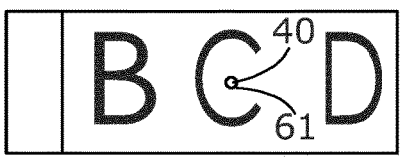

FIGS. 2C and 2D illustrate a user 70 continuing the placement gesture 60. This continuing placement gesture 60 comprises movement of the symbol relative to the viewport 30 but there is not substantial movement of the symbol 40 relative to the displayed content 20. The symbol position 61 varies with respect to the viewport 30 but does not vary or vary significantly with respect to the content 20. The symbol position 61 follows the same portion of content 20.

The symbol 40 has a variable position 61 that tracks the displayed content 20 that is moving within the viewport 30 to which the sound source 50 is to be locked.

For example, the continuing placement gesture 60 can be a drag movement of the symbol 40 relative to the viewport 30 that follows the displayed content 20. There is not significant movement relative to the displayed content 20.

The displayed content 20 that is tracked and to which the sound source 50 is to be locked is first content of a visual scene.

In some but not necessarily all examples, the first content is a majority of the visual scene that forms a background.

In some but not necessarily all examples, the first content is a minority of the visual scene being a visual object that moves within the visual scene.

Figure 2E:
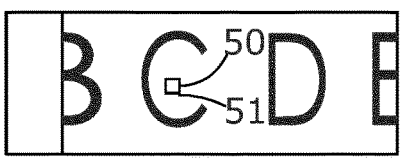
Figure 2F:
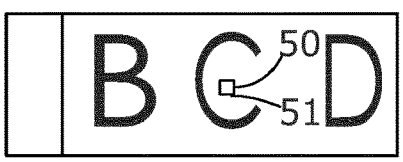
Figure 2G:
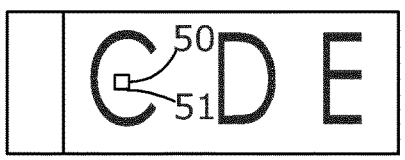

FIGS. 2E, 2F and 2G illustrate that, after the placement gesture 60 terminates, the sound source 50 is locked to a position 51 that moves with displayed content 20 moving within the viewport 30. The term 'locked' means that the sound source 50 is fixed to a position 51 without a requirement for continuing the placement gesture 60. The locking is not necessarily permanent and can be time-limited, for example.

Although the sound source 50 is illustrated as a visual element in the viewport 30, this is optional. In some examples the position 51 of the sound source 50 is not visually marked. In some examples, where the position 51 of the sound source 50 is visually marked using a visual element, the visual element can be the symbol 40 or a modified version of the symbol. In some examples, the user can make a user selection that causes the positions of one or more sound sources 50 to be visually indicated using a symbol 40. The placement methods 101, 102 can then be performed for any of those displayed symbols 40.

FIG. 3A to 3G illustrate an example of a viewport 30. Content 20 is displayed within the viewport 30. The content 20 is moving within the viewport 30. In these examples but not necessarily all examples, the content is stationary in FIGS. 3A & 3B, then it moves to the left (relative to the viewport 30) in FIGS. 3C, 3D, 3E, then it moves to the right (relative to the viewport 30) in FIGS. 3F, 3G. The FIGS. 3A to 3G are used to illustrate an example of the second placement method 102.

To facilitate comparison of the first placement method 101 and the second placement method 102, the same viewport 30, same moving displayed content 20, and same symbol 40 are used. However, it should be appreciated that this is only for the purpose of easy comparison and one or more of these features may differ between the methods.

Figure 3A:
FIG. 3 shows another example embodiment of the subject matter described herein.

In FIG. 3A, a symbol 40 representing a sound source 50 is displayed within the viewport 30. A user 70 performs a selection gesture 60 for the symbol 40.

Figure 3B:
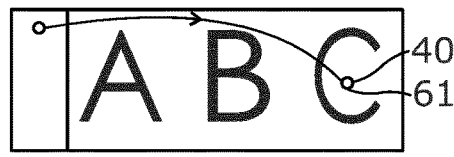

FIG. 3B illustrates a user 70 performing a placement gesture 60. This gesture is relative to the viewport 30 and the displayed content 20 and indicates a movement of the symbol 40 relative to the viewport 30 and the displayed content 20.

For example, the placement gesture 60 can be a drag movement of the symbol relative to the viewport 30 and the displayed content 20 to a symbol position 61 in the viewport 30 (and the displayed content 20).

Figure 3C:
Figure 3D:

FIGS. 3C and 3D illustrates a user 70 continuing the placement gesture 60. This continuing placement gesture 60 comprises movement of the symbol relative to the displayed content 20 but there is not substantial movement of the symbol 40 relative to the viewport 30. The symbol position 61 varies with respect to the displayed content 20 but does not vary or vary significantly with respect to the viewport 30.

The symbol 40 has a stationary position 61 within the viewport 30 to which the sound source 50 is to be locked. That position 61 does not track the displayed content 20 that is moving within the viewport 30.

For example, the continuing placement gesture 60 can be a stationary gesture without drag movement of the symbol 40 relative to the viewport 30. There is not significant movement relative to the viewport 30.

The placement gesture 60 comprises an initial drag movement of the symbol 40 relative to the viewport 30 and the displayed content 20 (FIG. 3B) and no subsequent movement of the symbol relative to the viewport 30 for a threshold time period (FIG. 3C, 3D). The threshold period of time can, for example, be 1 or 2 seconds.

Figure 3E:
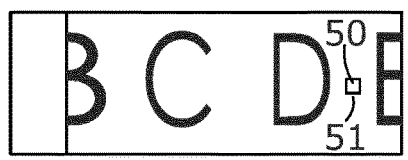
Figure 3F:
Figure 3G:

FIGS. 3E, 3F and 3G illustrate that, after the placement gesture 60 terminates, the sound source 50 is locked to a position 51 that does not move with displayed content 20 moving within the viewport 30. The term 'locked' means that the sound source 50 is fixed to a position 51 without a requirement for continuing the placement gesture 60. The locking is not necessarily permanent and can be time-limited, for example.

Although the sound source 50 is illustrated as a visual element in the viewport 30, this is optional. In some examples the position 51 of the sound source 50 is not visually marked. In some examples, where the position 51 of the sound source 50 is visually marked using a visual element, the visual element can be the symbol 40 or a modified version of the symbol. In some examples, the user can make a user selection that causes the positions of one or more sound sources 50 to be visually indicated using a symbol 40. The placement methods 101, 102 can then be performed for any of those displayed symbols 40.

Comparing the first placement method 101 and the second placement method 102, the first placement method 101 additionally comprises a gesture 60 relative to the viewport 30, for the symbol 40, indicating movement of the symbol 40 relative to the viewport 30. This gesture 60 (FIG. 2C, 2D) disambiguates the first placement method 101 from the second placement method 102.

The first placement method 101, in at least some examples, comprises placement method in which the symbol 40 is dragged to a position 61 within the displayed content 20 (C in FIG. 2B) and is then dragged with that content (FIG. 2C, 2D).

The second placement method 102, in at least some examples, comprises a placement method in which the symbol 40 is dragged to a position 61 within the viewport 30 and is then held at that position 61 within the viewport 30 (FIG. 3C, 3D).

The disambiguation process can, for example comprise:
determining a first position 61 (FIG. 2B, 2C) in the viewport 30 defined by an end-point of the gesture 60 dragging the symbol 40 relative to the viewport 30 and the displayed content 20.
determining a second position 61 (FIG. 2D, 3D) in the viewport 30 defined by termination of respective first placement method 101 or the second placement method 102.
determining a position difference between the first position 61 (FIG. 2B, 2C) and the second position 61 (FIG. 2D, 3D) and using the difference to disambiguate the first placement method 101 and the second placement method 102.

In the first placement method 101, the second position 61 is separated from the first position 61 in the viewport 30 by dragging the symbol 40 relative to the viewport 30. In the second placement method 102, the second position 61 is separated from the first position 61 in the content space by holding the symbol 40 in a substantially fixed position relative to the viewport 30.

Consequently, a small position difference in content space (or a large position difference in the viewport space) indicates the first placement method 101 has occurred and a large position difference in content space (or a small position difference in the viewport space) indicates the second placement method 102 has occurred.

In some but not necessarily all examples, the drag gestures 60 are performed as movement of a contact point on a surface of a touch screen display. In these examples, the termination of a placement method 101, 102 occurs when contact is terminated by lifting off the user's finger or the pointing device.

Where the viewport 30 is a touch display screen, the symbol 40 can be a displayed icon on the touch display screen. The one or more gestures 60 that place the displayed symbol 40 in the displayed content are touch-based gestures performed on the icon. The icon can be provided in a menu displayed on the touch display screen as part of a man machine interface for adding a spatial audio effect to visual content.

In some but not necessarily all examples, the displayed content 20 that is displayed within the viewport 30 is a sub-set of available content.

As illustrated in FIGS. 4A to 4F and 5A to 5F, the sub-set is defined by the viewport 30.

Each of FIGS. 4A, 4B, 4C, 4D, 4E, 4F corresponds, respectively, with FIGS. 2B, 2C, 2D, 2E, 2F, 2G. Each of FIGS. 5A, 5B, 5C, 5D, 5E, 5F corresponds, respectively, with FIGS. 3B, 3C, 3D, 3E, 3F, 3G.

FIGS. 4A to 4F and FIG. 5A to 5F illustrate a relationship of the viewport 30 to the available content ABCDE. The displayed content 20 is that part of the available content that overlaps with the viewport 30. The viewport 30 moves relative to the available content changing the displayed content 20.

In the examples 4A to 4C, which correspond to the first placement method 101, a position 61 of the gesture controlled symbol 40 remains static relative to a particular portion (C) of the displayed content 20 and moves within the viewport 30 in an opposite sense and to a same extent as how the viewport moves relative to the available content 20. Detection of this placement method 101, causes a position 51 of the sound source 50 to be locked to the particular portion (C) of the displayed content 20 defined by the placement method 101. In the examples 4D to 4F, a position 51 of the sound source 50 remains static relative to a particular portion (C) of the displayed content 20 and moves within the viewport 30 in a opposite sense and to a same extent as how the viewport moves relative to the available content 20.

The first placement method 101 locks the sound source 50 to a position 51 that moves with displayed content 20 not the viewport 30.

In this example, the first placement method 101 comprises a holding gesture 60 that holds the displayed symbol 40 at a fixed position 61 relative to the content while the viewport 30 moves In the examples 5A to 5C, which correspond to the second placement method 102, a position 61 of the gesture-controlled symbol 40 remains static relative to a particular portion (X) of the viewport 30 and moves with the viewport 30. The position 61 of the gesture-controlled symbol 40 moves within the displayed content 20 in a same sense and to a same extent as how the viewport moves relative to the available content 20. Detection of this placement method 102, causes a position 51 of the sound source 50 to be locked to the particular portion (X) of the viewport defined by the placement method 102. In the examples 5D to 5F, a position 51 of the sound source 50 remains static relative to a particular portion (X) of the viewport 30 and moves within the displayed content 20 in the same sense and to the same extent as how the viewport moves relative to the available content 20.

The second placement method 102 locks the sound source 50 to a position 51 that moves with the viewport 30 not the displayed content 20. The sound source 50 tracks with the viewport 30, not displayed content 20 that is moving relative to the viewport 30.

In this example, the second placement method 102 comprises a holding gesture 60 that holds the displayed symbol 40 at a fixed position 61 relative to the viewport while the viewport moves.

FIGS. 6A to 6B and 7A to 7B illustrate examples in which the viewport 30 is a touch display screen of a handheld apparatus.

Figure 6A:
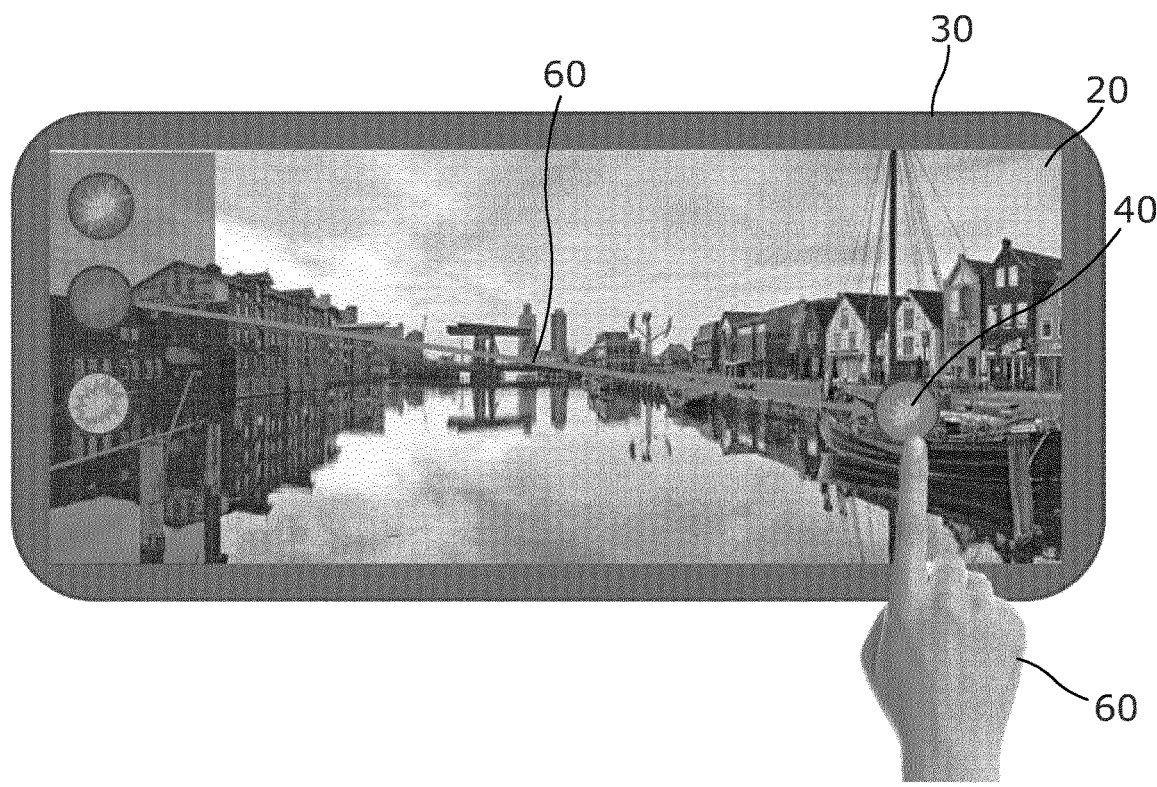
FIG. 6 shows another example embodiment of the subject matter described herein.
Figure 6B:
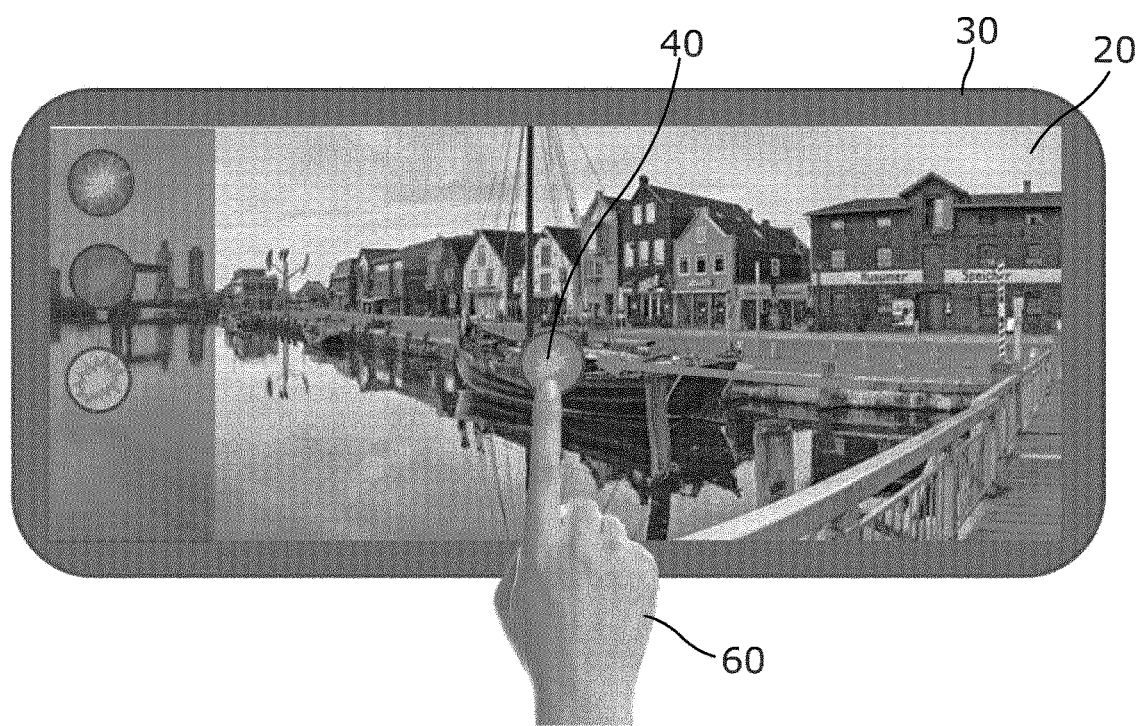

FIGS. 6A to 6B illustrate an example of the first placement method 101 when the viewport 30 is a touch display screen of a handheld apparatus.

In FIG. 6A, a symbol 40 representing a sound source 50 is displayed within the viewport 30. A user 70 performs placement gestures 60, and optionally selection gestures 60, on the symbol 40. The user touches the symbol 40 with a finger or pointer and drags it to a desired position within the displayed content 20 of the viewport 30.

In FIG. 6B, the user 70 continues the placement gesture 60. The user continues to touch the symbol 40 with the finger or pointer and drags across the viewport 30. This continuing placement gesture 60 comprises movement of the symbol relative to the viewport 30 but there is not substantial movement of the symbol 40 relative to the displayed content 20. The symbol position varies with respect to the viewport 30 but does not vary or vary significantly with respect to the content 20. The symbol position 61 follows the same portion of content 20.

Figure 7A:
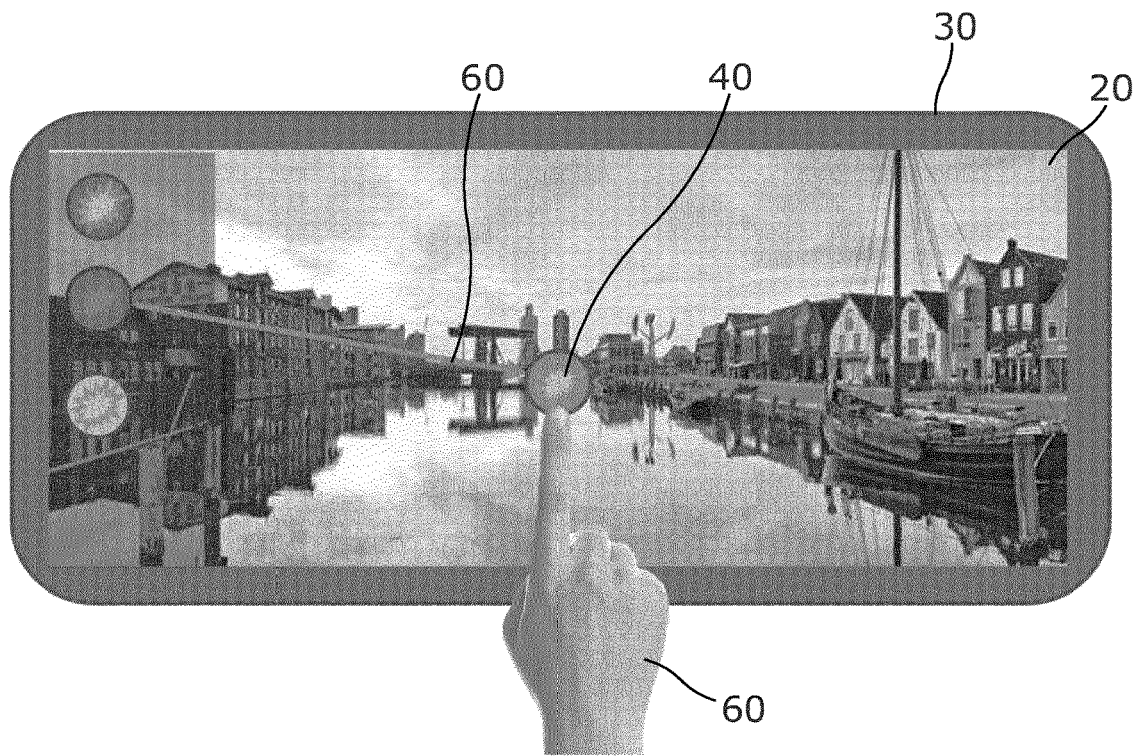
FIG. 7 shows another example embodiment of the subject matter described herein.
Figure 7B:
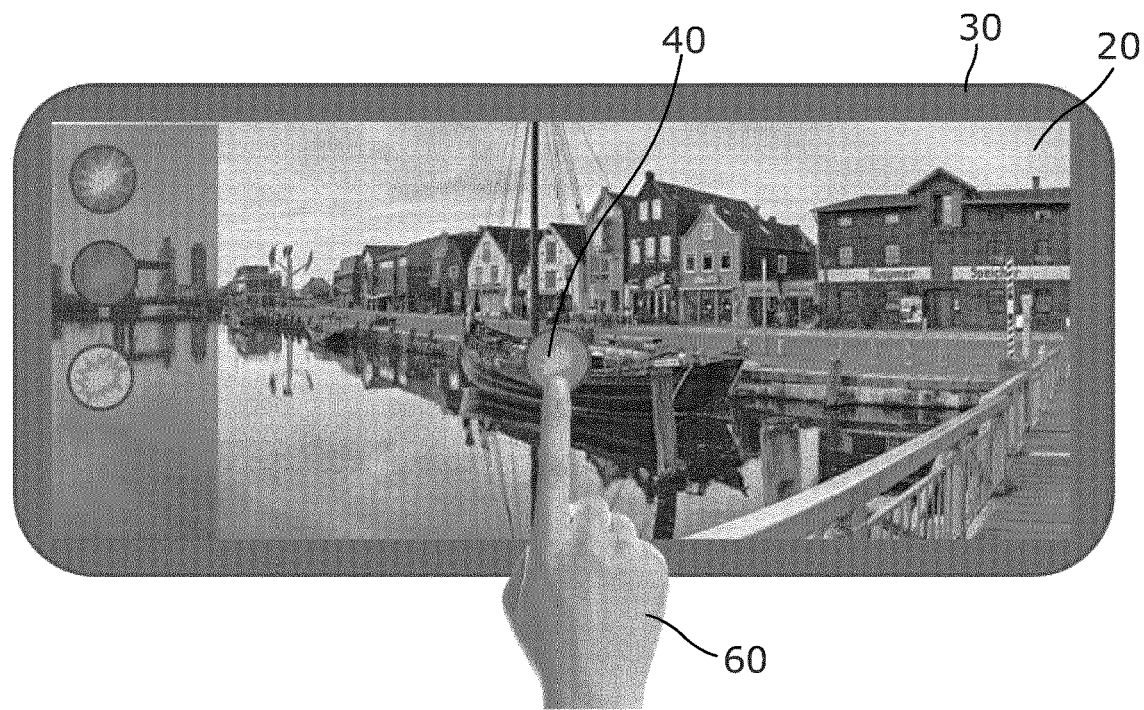

FIGS. 7A to 7B illustrate an example of the second placement method 102 when the viewport 30 is a touch display screen of a handheld apparatus.

In FIG. 7A, a symbol 40 representing a sound source 50 is displayed within the viewport 30. A user 70 performs placement gestures 60, and optionally selection gestures 60, on the symbol 40. The user touches the symbol 40 with a finger or pointer and drags it to a desired position within the displayed content 20 of the viewport 30.

In FIG. 7B, the user 70 continues the placement gesture 60. The user continues to touch the symbol 40 with the finger or pointer while keeping the finger or pointer substantially stationary with respect to the viewport 30. This continuing placement gesture 60 comprises movement of the symbol relative to the displayed content 20 but there is not substantial movement of the symbol 40 relative to the viewport 30. The symbol position varies with respect to the displayed content 20 but does not vary or vary significantly with respect to the viewport 30.

Figure 8A:
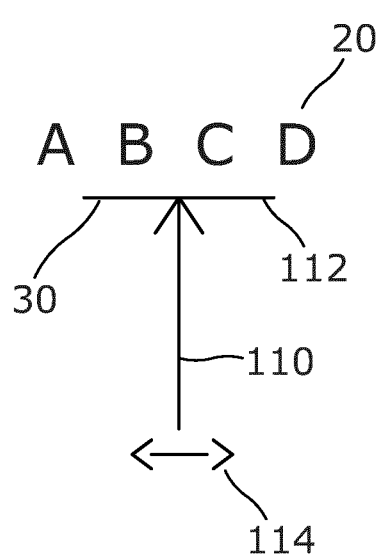
FIG. 8 shows another example embodiment of the subject matter described herein.
Figure 8B:
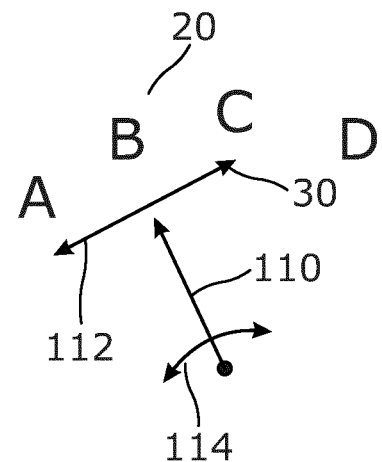

FIGS. 8A and 8B illustrate examples of how the viewport 30 can move relative to the available content changing the displayed content 20.

In these examples, the viewport is defined by a point of view 110 and a field of view 112.

One or both of the displayed content and the point of view 110 are time-variable.

In the example illustrated in FIG. 8A, the point of view 110 is variable by a change in location. This corresponds to a tracking shot of the available content.

In the example illustrated in FIG. 8B, the point of view 110 is variable by a change in orientation. This corresponds to a panning shot of the available content.

It will be appreciated that in these examples, the second placement method 102 locks the sound source 50 to the point of view 110, such that a position 51 of the sound source 50 relative to the point of view 110 is invariant as the point of view 110 changes. The second placement method 102 locks the sound source 50 to a position 51 that moves with the viewport 30 not the displayed content 20. The first placement method 101 locks the sound source 50 to the same displayed content as the point of view 110 changes. The first placement method 101 locks the sound source 50 to a position 51 that moves with displayed content 20 not the viewport 30.

Figure 9A:
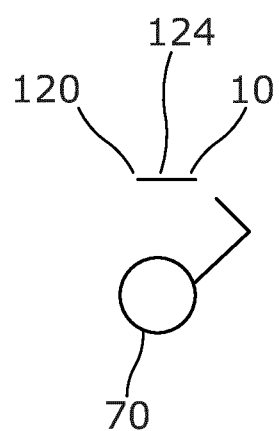
FIG. 9 shows another example embodiment of the subject matter described herein.
Figure 9B:
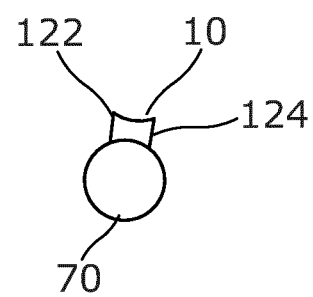
Figure 10A:
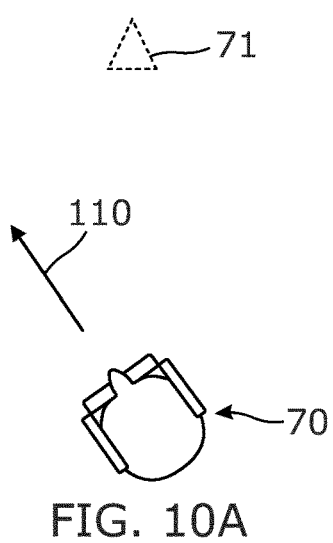
FIG. 10 shows another example embodiment of the subject matter described herein.

FIGS. 9A and 9B illustrate some examples of how the point of view 110 can be varied.

FIG. 9A illustrates an example in which the display 124 used by the apparatus 10 is part of a handheld apparatus 120.

The handheld apparatus 120 comprises a display 124 that is used for displaying the displayed content 20 and the displayed symbol 40 to the user 70. The handheld apparatus 120 may be moved deliberately in the hands of a user 70 in one or more of the six degrees of freedom (three for orientation and three for translation) to define different points of view 110.

If the handheld apparatus has a camera mounted on a face opposite the display, it may be operated as a see-video arrangement that enables a live real scene to be viewed while one or more visual elements, such as the symbol 40, are displayed to the user to provide in combination a virtual scene.

The handheld apparatus may be or may be operated as a see-video arrangement for mediated reality that enables a live or recorded video of a real scene or other content to be displayed on the display 124 for viewing by the user while one or more visual elements, such as the symbol 40, are simultaneously displayed on the display 124 for viewing by the user. The combination of the displayed real scene or other content and displayed one or more visual elements provides a virtual scene to the user.

In some but not necessarily all examples, the apparatus 10 is an image capturing apparatus, for, example a camera. The displayed content 20 can be content that is simultaneously displayed in the camera viewfinder and recorded as captured content. It can for example, be used for editing the content, as it is being captured, to add spatial audio effects. In this example, the content-locked sound source 50 comes from the same position in the world even when the camera is being panned. In this example, the viewport-locked sound source 50 follows the movement of the camera and its viewport. The sound source 50 when rendered comes from the same direction regardless of where the camera is pointing.

FIG. 9B illustrates an example in which the display 124 used by the apparatus 10 is head-mounted apparatus 122.

The head-mounted apparatus 122 comprises a display 124 that is used for displaying the displayed content 20 and the displayed symbol 40 to the user 70. The head-mounted apparatus may be moved automatically when a head of the user moves. The head-mounted apparatus 122 may be moved in one or more of the six degrees of freedom (three for orientation and three for translation) to define different points of view 110.

The head-mounted apparatus 122 may be operated as a see-through arrangement for augmented reality that enables a live real scene to be viewed while one or more visual elements, such as the symbol 40, are displayed by the display 124 to the user to provide in combination the virtual scene. In this case a visor, if present, is transparent or semi-transparent so that the live real scene can be viewed through the visor.

The head-mounted apparatus 122 may be operated as a see-video arrangement for mediated reality that enables a live or recorded video of a real scene or other content to be displayed by the display 124 for viewing by the user while one or more visual elements, such as the symbol 40, are simultaneously displayed by the display for viewing by the user. The combination of the displayed scene and displayed one or more visual elements provides a virtual scene to the user. In this case a visor is opaque and may be used as display 124.

Mediated reality means the rendering of mediated reality for the purposes of achieving mediated reality for a remote user, for example augmented reality or virtual reality. The mediated reality may support one or more of 3DoF, 3DoF+ or 6DoF.

A user in a real space has a real point of view defined by a location and an orientation. The location is a three-dimensional location and the orientation is a three-dimensional orientation.

In an example of 3DoF mediated reality, the user's real point of view (orientation) determines a virtual point of view 110, within a virtual space, of a virtual user. An orientation of the user controls a virtual orientation of a virtual user. There is a correspondence between the real orientation of the user and the virtual orientation of the virtual user such that a change in the real orientation produces the same change in the virtual orientation.

The virtual orientation of the virtual user in combination with a virtual field of view defines a virtual visual scene within the virtual visual space. The virtual visual scene is presented to the user as the displayed content 20. In some examples, the virtual visual scene can additionally define a virtual sound scene.

A virtual visual scene is that part of the virtual visual space (the available content) that is displayed to a user via the displayed content 20. A virtual sound scene is that part of a virtual sound space that is rendered to a user. The virtual sound space and the virtual visual space correspond and form a combined virtual space. The virtual sound space and the virtual visual space correspond in that a point of view within the virtual sound space has an equivalent point of view within the virtual visual space. In 3DoF mediated reality, a change in the location of the user does not change the virtual location or virtual orientation of the virtual user.

In the example of 6DoF and 3DoF+ mediated reality, the user's real point of view (location and/or orientation) determines the virtual point of view (location and/or orientation) within the virtual space of a virtual user. The situation is as described for 3DoF and in addition it is possible to change the rendered virtual sound scene and the displayed virtual visual scene by movement of a location of the user. For example, there may be a mapping between the location of the user and the virtual location of the virtual user. A change in the location of the user produces a corresponding change in the virtual location of the virtual user. A change in the virtual location of the virtual user changes the rendered sound scene and also changes the rendered visual scene. In 6DoF, the change in location may arise from a postural change of the user and/or a translation of the user by walking or otherwise. In 3DoF+, the change in location may arise from a postural change of the user.

In some situations, it may be desirable for a portion of the virtual sound space to remain fixed in the virtual space when the virtual point of view of the virtual user changes.

Viewport-locked sounds, defined by placement method 102, are fixed relative to the virtual point of view 110 of the virtual user so that when the user changes their point of view 110 the positions of the sound sources 50 relative to the user do not change.

Content-locked sounds, defined by placement method 101, are fixed in space so that when the user changes their point of view 110, the positions 51 of the sound sources 50 relative to the user also change.

FIGS. 10A to 13E illustrate, in detail, examples of how the apparatus 10 enables a user 70 to indicate whether a sound source 50 (not illustrated), represented by symbol 40, added into a virtual sound space is viewport-locked or content-locked.

FIGS. 10A-10E and 12A-12E illustrate the virtual user who has a point of view 110 within a virtual space that comprises sound sources 50. As previously described, in first-person perspective mediated reality, there is a correspondence between the virtual user and the user and the point of view of the virtual user and the point of view of the user. The user may vary the point of view 110 by changing an orientation of the user's head when wearing a head-mounted apparatus 122. This changes the virtual point of view 110.

FIGS. 11A-11E illustrate displayed content 20 within a viewport 30. The displayed content 20 corresponds to the virtual visual scene defined by the virtual point of view 110 in respective FIGS. 10A-10E.

In the example of FIGS. 10A-11E, gesture 60 defines a sound source 50 to be added to a virtual sound space of the virtual space as a content-locked sound.

Figure 11A:
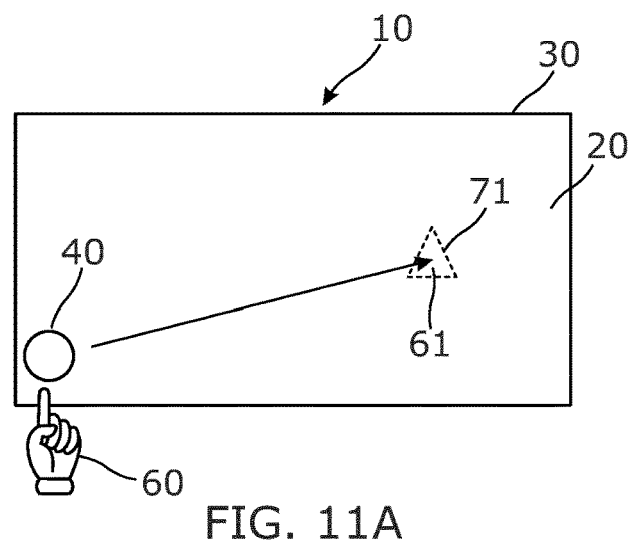
FIG. 11 shows another example embodiment of the subject matter described herein.
Figure 10B:
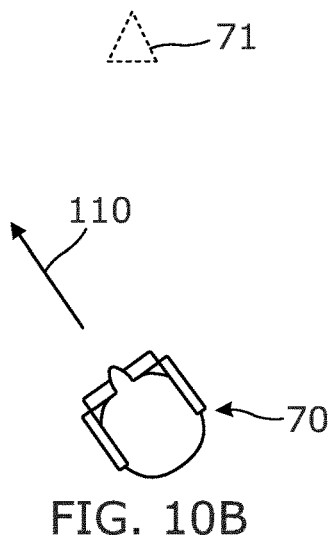
Figure 13A:
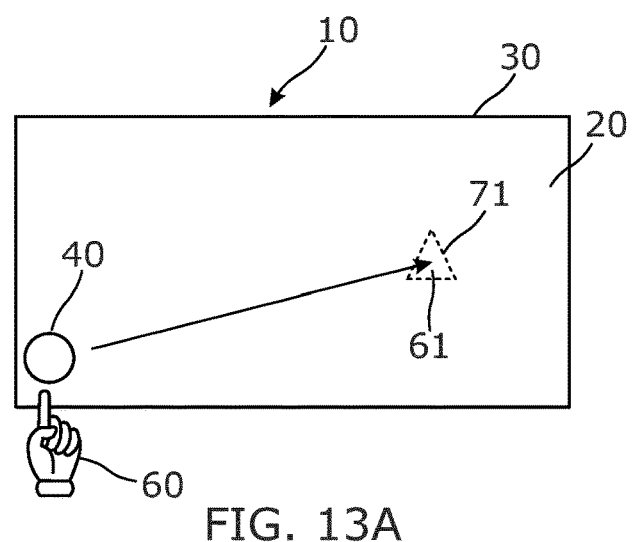
FIG. 13 shows another example embodiment of the subject matter described herein.
Figure 12B:
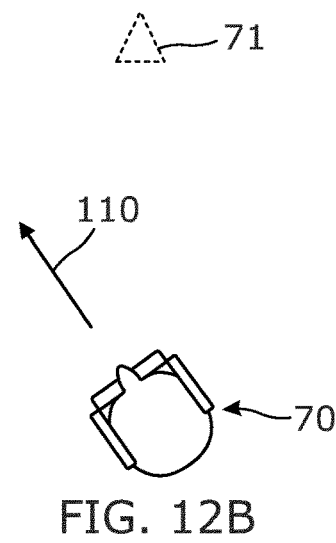

In FIG. 11A, the user 70 performs an initial gesture 60 to move the symbol 40 representing a sound source 50 to the desired position 61 in the viewport 30. In the example of FIG. 13A, the user grabs the symbol 40 and drags it to the position 61 that corresponds to virtual object 71 in the displayed content 20.

Figure 11B:
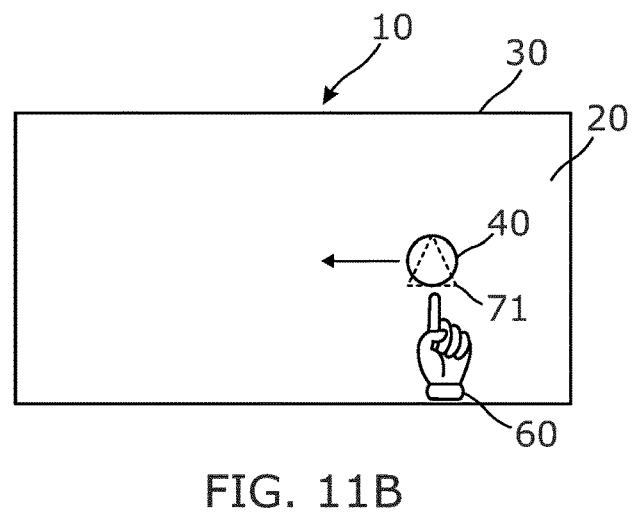
Figure 10C:
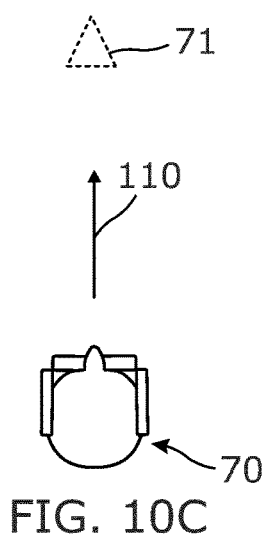
Figure 11C:
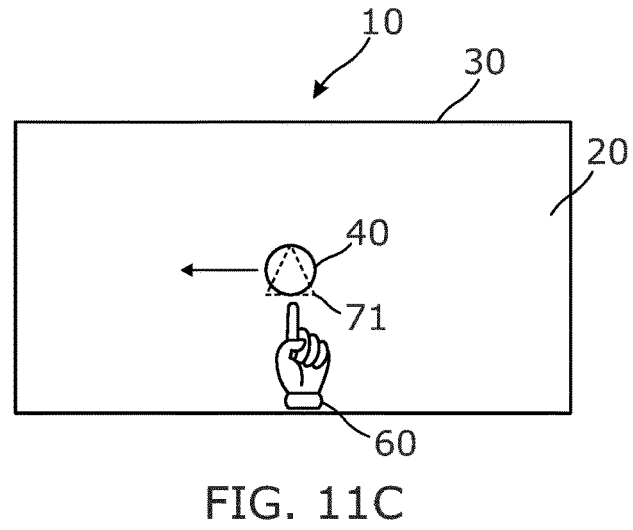
Figure 10D:
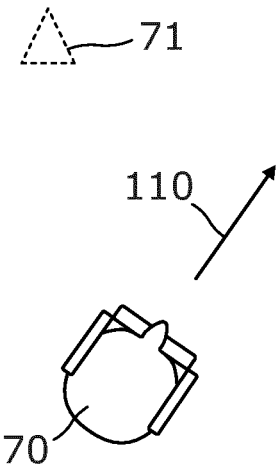
Figure 11D:
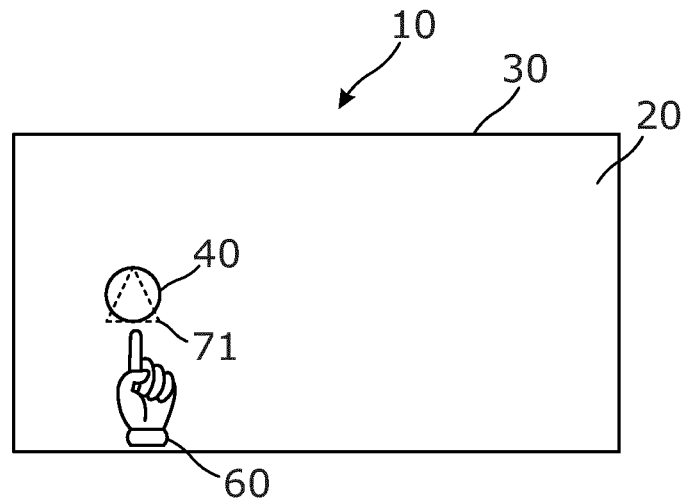
Figure 10E:
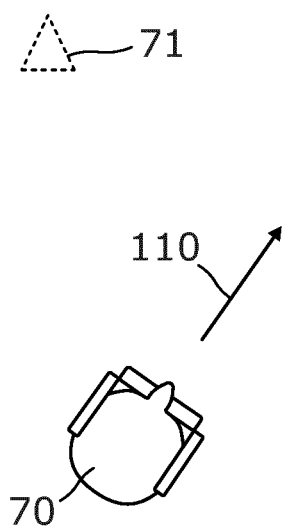

In FIGS. 11B-11D, the virtual point of view 110 of the virtual user changes, changing the displayed content 20 visible in the viewport 30. The gesture 60 moves relative to the virtual point of view 110. The symbol 40 is held static relative to the virtual object 71 by the gesture 60.

Figure 11E:
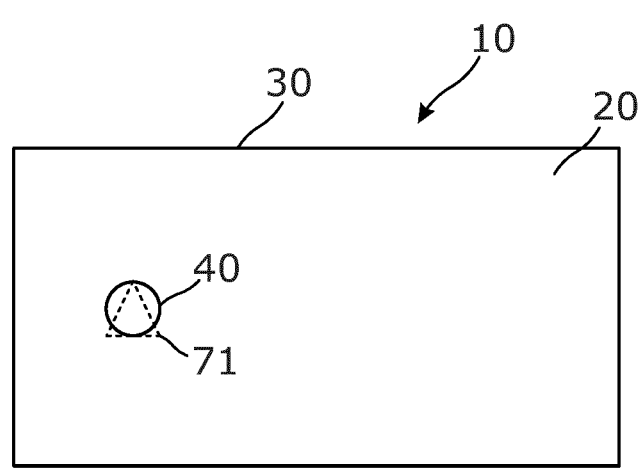
Figure 12A:
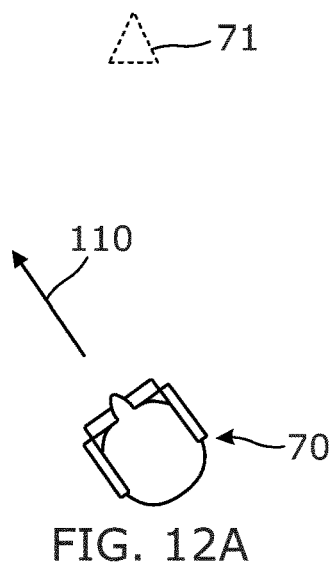
FIG. 12 shows another example embodiment of the subject matter described herein.

In FIG. 11E, the gesture is terminated. The sound source 50 is then locked to the displayed content 20. In the example of FIG. 13E, the sound source 50 is locked to the virtual object 71.

FIGS. 13A-13E illustrate displayed content 20 within a viewport 30. The displayed content 20 corresponds to the virtual visual scene defined by the virtual point of view 110 in respective FIGS. 12A-12E.

In the example of FIGS. 12A-13E, gesture 60 defines a sound source 50 to be added to a virtual sound space of the virtual space as a viewport-locked sound.

In FIG. 13A, the user performs an initial gesture 60 to move the symbol 40 representing a sound source 50 to the desired position 61 in the viewport 30. In the example of FIG. 13A, the user grabs the symbol 40 and drags it to the position 61 in the viewport 30. For purposes of comparison, this position corresponds to virtual object 71 in the displayed content 20.

Figure 13B:
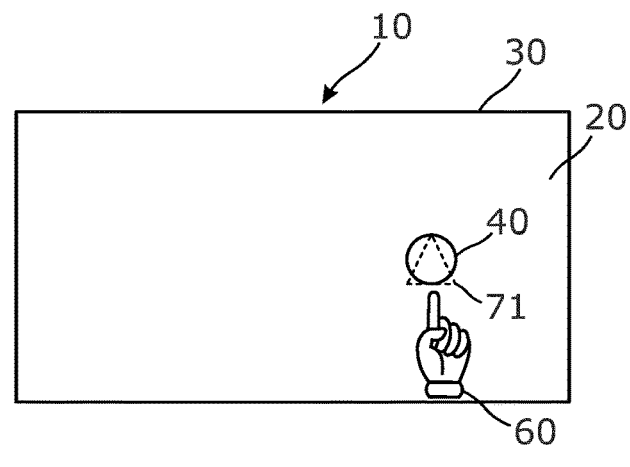
Figure 12C:
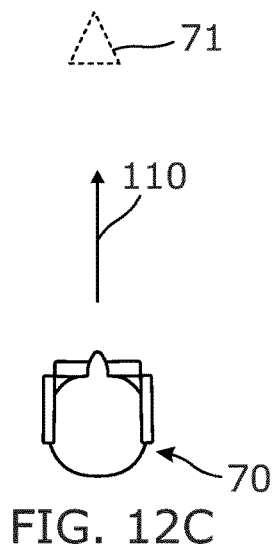
Figure 13C:
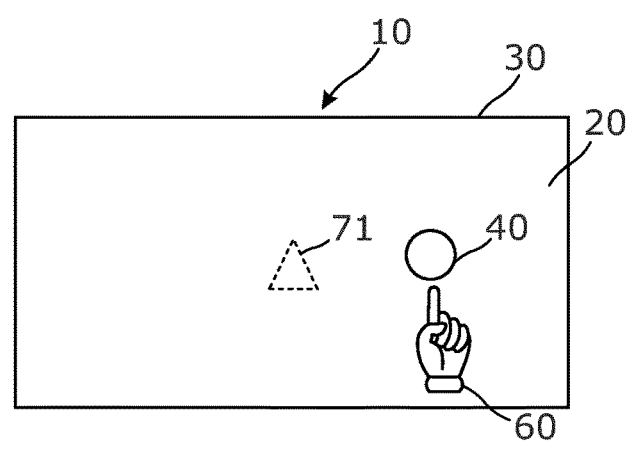
Figure 12D:
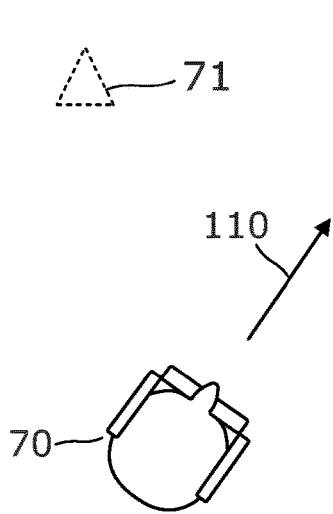
Figure 13D:
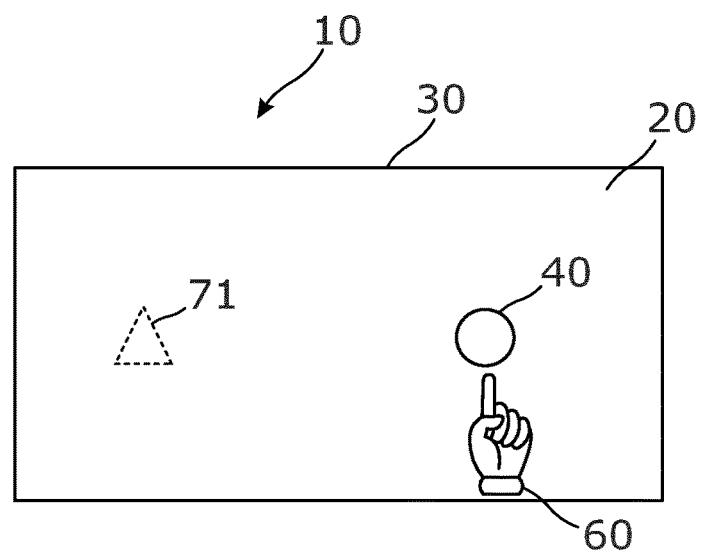
Figure 12E:
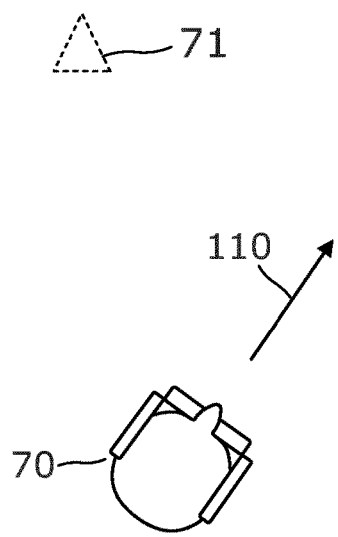
Figure 13E:
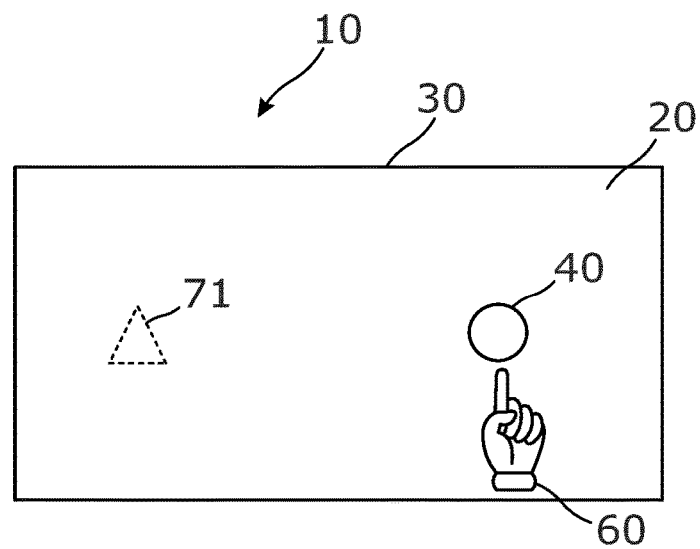

In FIGS. 13B-13D, the virtual point of view 110 of the virtual user changes, changing the displayed content 20 visible in the viewport 30. The gesture 60 moves with the virtual point of view 110, that is with the viewport 30 and not with the displayed content 20. The symbol 40 is held static relative to the viewport 30/point of view 110 by the gesture 60.

In FIG. 13E, the gesture is terminated. The sound source 50 is then locked to the point of view 110 of the user and the viewport 30.

Sound sources 50 can be content-locked or viewport-locked. A content-locked sound source 50 has a position that moves with displayed content 20. It can, for example, shift relative to the user along with a shift in a visual scene relative to the user or can, for example follow an object or other portion of displayed content that moves within the displayed content. A viewport-locked sound has a position that does not move with displayed content moving within the viewport but remains static relative to the viewport and user. It can, for example, remain stationary relative to a user with a shift in visual scene relative to the user.

The sounds rendered to a user can comprise only content-locked sounds, only viewport-locked sounds or a combination of content-locked sounds and viewport-locked sounds.

The user can use the described methods and apparatus to control whether a sound will be rendered as a content-locked sound or a viewport-locked sound.

A content-locked sound source 50 produced by placement method 101 and a viewport-locked sound source 50 produced by placement method 102 can be rendered to a user using the same or different audio output device. Examples of audio output devices include headphones and loudspeakers.

When a content-locked sound is rendered using loudspeakers, as the real orientation of the user changes, the sound source 50 remains static relative to the loudspeakers when the point of view of the virtual user changes.

When a content-locked sound is rendered using headphones the position and/or orientation of the sound source 50 needs to change relative to the headphones by the same amount in the opposite sense to the change in the virtual point of view of the virtual user. The position and/or orientation of the sound source 50 tracks opposite to the change in virtual point of view 110 of the virtual user so that the position and/or orientation of the sound source 50 remains fixed in the virtual space and does not move with the virtual point of view 110 of the virtual user.

When a viewport-locked sound is rendered using headphones, the sound source 50 remains static relative to the headphones when the point of view of the virtual user changes When a viewport-locked sound is rendered using loudspeakers the position and/or orientation of the sound source 50 needs to change relative to the loudspeakers by the same amount in the same sense to the change in the virtual point of view of the virtual user. The position and/or orientation of the sound source 50 tracks the change in virtual point of view 110 of the virtual user so that the position and/or orientation of the sound source 50 remains fixed in the real space and moves with the virtual point of view 110 of the virtual user.

Channel-based audio, for example, surround sound (e.g. 5.1, 7.1 or 22.2 surround sound) or binaural audio, can be used or scene-based audio, including spatial information about a sound field and sound sources, can be used.

Audio content may encode spatial audio as audio objects. Examples include but are not limited to MPEG-4 and MPEG SAOC. MPEG SAOC is an example of metadata-assisted spatial audio.

Audio content may encode spatial audio as audio objects in the form of moving virtual loudspeakers.

Audio content may encode spatial audio as audio signals with parametric side information or metadata. The audio signals can be, for example, First Order Ambisonics (FOA) or its special case B-format, Higher Order Ambisonics (HOA) signals or mid-side stereo. For such audio signals, synthesis which utilizes the audio signals and the parametric metadata is used to synthesize the audio scene so that a desired spatial perception is created.

The parametric metadata may be produced by different techniques. For example, Nokia's spatial audio capture (OZO Audio) or Directional Audio Coding (DirAC) can be used. Both capture a sound field and represent it using parametric metadata. The parametric metadata may for example comprise: direction parameters that indicate direction per frequency band; distance parameters that indicate distance per frequency band; energy-split parameters that indicate diffuse-to-total energy ratio per frequency band. Each time-frequency tile may be treated as a sound source with the direction parameter controlling vector based amplitude panning for a direct version and the energy-split parameter controlling differential gain for an indirect (decorrelated) version.

3GPP IVAS (3GPP, Immersive Voice and Audio services), which currently under development, is expected to support new immersive voice and audio services, for example, mediated reality.

In some but not necessarily all examples amplitude panning techniques may be used to create or position a sound object. For example, the known method of vector-based amplitude panning (VBAP) can be used to position a sound source.

A sound object may be re-positioned by mixing a portion of a direct form of the object (an attenuated and directionally-filtered direct sound) with an indirect form of the object (e.g. positioned directional early reflections and/or diffuse reverberant).

FIG. 14 illustrates an example of a method 300 comprising:

At block 302 displaying content within a viewport and displaying a symbol representing a sound within the viewport;

At block 304, detecting one or more gestures that place the displayed symbol in the displayed content;

At block 306, disambiguating between a first placement method, performed for the symbol, that locks the sound to a position that moves with displayed content moving within the viewport and a second placement method performed for the symbol that is different to the first placement method and locks the sound to a position that does not move with displayed content moving within the viewport, wherein the first placement method comprises a gesture relative to the viewport, for the symbol, indicating movement of the symbol relative to the viewport that disambiguates the first placement method from the second placement method.

Figure 15A:
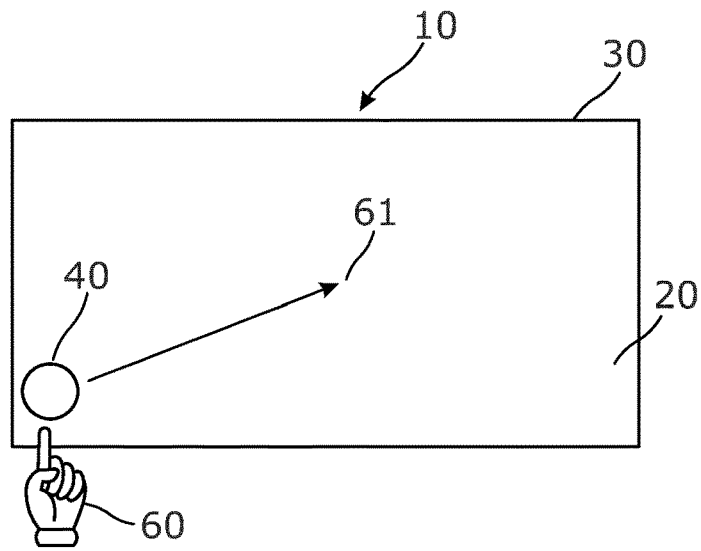
FIG. 15 shows another example embodiment of the subject matter described herein.
Figure 15B:
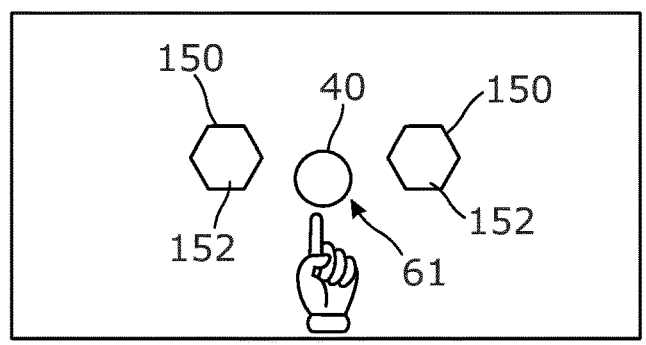
Figure 15C:
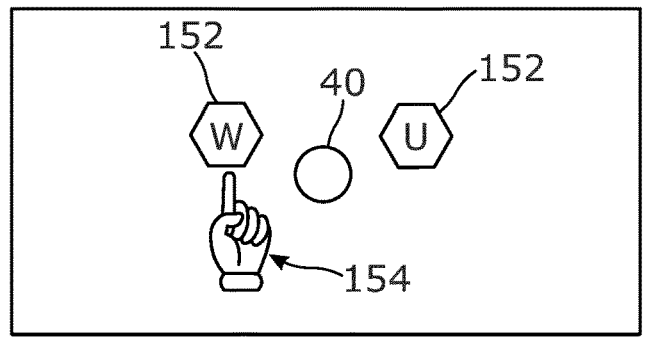

FIGS. 15A-15C illustrate an alternative example method of indicating whether a sound source 50 to be added to the displayed content 20 is a content-locked or viewport-locked.

In FIG. 15A, the user performs an initial gesture 60 to move the symbol 40 representing the sound source 50 to a desired position 61 in the viewport 30.

In FIG. 15B, a prompt 150 is displayed in the viewport 30 inviting the user to make an input indicating whether the sound source 50 to be added to the displayed content 20 is a content-locked sound or a viewport-locked sound. In the example of FIG. 15B, the prompt is in the form of selectable icons 152 positioned close to the desired position 61 of the sound source 50 within the displayed content 20.

In FIG. 15C, the user makes an input 154 indicating whether the sound source 50 is a content-locked sound or a viewport-locked sound. In the example of FIG. 15C, the user input is made by selecting one of the selectable icons 152 displayed by the prompt 150. The sound source 50 is then defined as content-locked or viewport-locked depending on the input 154.

The method illustrated in FIGS. 15A to 15C is particularly useful when the displayed content 20 is static in the viewport 30. In this circumstance it is not possible to disambiguate between the first and second placement methods 101, 102 without further input. Holding the symbol 40 static relative to the displayed content 20 within the viewport 30 (placement method 101) and holding the symbol 40 static relative to the viewport 30 (placement method 102) cannot be disambiguated without further input when all the displayed content 20 is not moving relative to the viewport 30. This is because following a visual object while the video is static is the same as holding still. The method illustrated in FIGS. 15A to 15C provides the further input that enable disambiguation. It prompts the user to provide explicit disambiguation by selecting which effect (viewport-locked sound or content-locked sound) the user wishes to use for the added sound source 50.

FIG. 16 illustrates a method 310 for determining whether or not to provide the prompt 150.

At block 312 it is determined whether or not the displayed content 20 is static for the remaining time duration. If the displayed content 20 is static for the remaining time duration, the method moves to block 312. If the displayed content 20 is not static for the remaining time duration, the method moves to block 316.

At block 314, the sound source 50 is added at the desired position 61 (content-locked and viewport-locked are the same).

At block 316, it is determined whether or not the displayed content 20 is static at the current time.

If it is determined that the displayed content 20 is static at the current time, the prompt 150 is generated at block 318.

If it is determined that the displayed content 20 is not static at the current time, then disambiguation as previously described can occur.

While the method 310 is described as occurring before the process of disambiguation, in other examples it could occur after the process of disambiguation, should it fail.

FIG. 17A illustrates an example of a controller 400. Such a controller may be used to control performance of any or all of the functions of the apparatus 10 and/or perform any of the previously described methods.

Implementation of a controller 400 may be as controller circuitry. The controller 400 may be implemented in hardware alone, have certain aspects in software including firmware alone or can be a combination of hardware and software (including firmware).

As illustrated in FIG. 17A the controller 400 may be implemented using instructions that enable hardware functionality, for example, by using executable instructions of a computer program 412 in a general-purpose or special-purpose processor 402 that may be stored on a computer readable storage medium (disk, memory etc) to be executed by such a processor 402.

The processor 402 is configured to read from and write to the memory 410. The processor 402 may also comprise an output interface via which data and/or commands are output by the processor 402 and an input interface via which data and/or commands are input to the processor 402.

The memory 410 stores a computer program 412 comprising computer program instructions (computer program code) that controls the operation of the apparatus 10 when loaded into the processor 402. The computer program instructions, of the computer program 412, provide the logic and routines that enables the apparatus to perform the methods illustrated in FIGS. 1 to 15. The processor 402 by reading the memory 410 is able to load and execute the computer program 412.

The apparatus 10 therefore comprises:

at least one processor 402; and at least one memory 410 including computer program code the at least one memory 410 and the computer program code configured to, with the at least one processor 402, cause the apparatus 10 at least to perform:

displaying content within a viewport;

displaying a symbol representing a sound within the viewport;

detecting one or more gestures that place the displayed symbol in the displayed content;

disambiguating between a first placement method, performed for the symbol, that locks the sound to a position that moves with displayed content moving within the viewport and a second placement method performed for the symbol that is different to the first placement method and locks the sound to a position that does not move with displayed content moving within the viewport, wherein the first placement method comprises a gesture relative to the viewport, for the symbol, indicating movement of the symbol relative to the viewport that disambiguates the first placement method from the second placement method.

The apparatus 10 can therefore comprises computer program means for displaying content within a viewport;

displaying a symbol representing a sound within the viewport;

detecting one or more gestures that place the displayed symbol in the displayed content;

disambiguating between a first placement method, performed for the symbol, that locks the sound to a position that moves with displayed content moving within the viewport and a second placement method performed for the symbol that is different to the first placement method and locks the sound to a position that does not move with displayed content moving within the viewport, wherein the first placement method comprises a gesture relative to the viewport, for the symbol, indicating movement of the symbol relative to the viewport that disambiguates the first placement method from the second placement method.

As illustrated in FIG. 17B, the computer program 412 may arrive at the apparatus 10 via any suitable delivery mechanism 420. The delivery mechanism 420 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 412. The delivery mechanism may be a signal configured to reliably transfer the computer program 412. The apparatus 10 may propagate or transmit the computer program 412 as a computer data signal.

In at least some examples, the computer program instructions are configured to cause an apparatus to perform at least the following:

displaying content within a viewport;

displaying a symbol representing a sound within the viewport;

detecting one or more gestures that place the displayed symbol in the displayed content;

disambiguating between a first placement method, performed for the symbol, that locks the sound to a position that moves with displayed content moving within the viewport and a second placement method performed for the symbol that is different to the first placement method and locks the sound to a position that does not move with displayed content moving within the viewport, wherein the first placement method comprises a gesture relative to the viewport, for the symbol, indicating movement of the symbol relative to the viewport that disambiguates the first placement method from the second placement method.

The computer program instructions may be comprised in a computer program, a non-transitory computer readable medium, a computer program product, a machine readable medium. In some but not necessarily all examples, the computer program instructions may be distributed over more than one computer program.

Although the memory 410 is illustrated as a single component/circuitry it may be implemented as one or more separate components/circuitry some or all of which may be integrated/removable and/or may provide permanent/semi-permanent/dynamic/cached storage.

Although the processor 402 is illustrated as a single component/circuitry it may be implemented as one or more separate components/circuitry some or all of which may be integrated/removable. The processor 402 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a hand portable device or a similar integrated circuit in a server, a cellular network device, or other computing or network device.

The blocks illustrated in the FIGS. may represent steps in a method and/or sections of code in the computer program 412. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

The above described examples find application as enabling components of:

automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although embodiments have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain embodiments, those features may also be present in other embodiments whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer and exclusive meaning.

The presence of a feature (or combination of features) in a claim is a reference to that feature) or combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:
   at least one processor; and
   at least one memory storing instructions that, when executed by the at least one processor, cause the apparatus at least to:
   display content within a viewport;
   display a symbol representing a sound source within the viewport;
   detect one or more gestures that place the displayed symbol in the displayed content; and
   determine whether the one or more gestures comprise a first placement method or a second placement method, wherein the first placement method comprises a placement method performed for the symbol that locks the sound source to a first position within the displayed content that moves with the displayed content within the viewport as the viewport moves, wherein the first placement method comprises at least a gesture configured to move the symbol with the displayed content, relative to the viewport, as the viewport moves, wherein the second placement method comprises a placement method performed for the symbol that is different to the first placement method and locks the sound source to a second position within the viewport that does not move with the displayed content within the viewport as the viewport moves, wherein the second placement method comprises a gesture configured to hold the symbol at the second position within the viewport as the viewport moves, wherein the first placement method comprises, at least, a disambiguating gesture relative to the viewport, for the symbol, indicating movement of the symbol relative to the viewport, wherein the disambiguating gesture is configured to disambiguate the first placement method from the second placement method.

2. The apparatus as claimed in claim 1, wherein the disambiguating gesture of the first placement method comprises dragging the symbol relative to the viewport.

3. The apparatus as claimed in claim 2, wherein the first placement method comprises a prior gesture, before the disambiguating gesture, dragging the symbol relative to the viewport and the displayed content.

4. The apparatus as claimed in claim 3, where the at least one memory stores instructions that, when executed by the at least one processor, cause the apparatus to:
determine a third position in the viewport defined with an end-point of the prior gesture dragging the symbol relative to the viewport and the displayed content; and
determine a fourth position in the viewport defined with termination of at least one of the first placement method or the second placement method; wherein a difference between the third position and the fourth position is configured to disambiguate the first placement method from the second placement method.

5. The apparatus as claimed in claim 1, wherein:
the first placement method comprises a placement method in which the symbol is dragged to the content and is then dragged with the content, and
the second placement method comprises a placement method in which the symbol is dragged to the second position within the viewport and is then held at the second position within the viewport.

6. The apparatus as claimed in claim 1, wherein:
the first placement method and the second placement method comprise:
selection of the symbol and an initial gesture for the symbol relative to the viewport and the displayed content indicating the movement of the symbol relative to the viewport and the displayed content,
the first placement method additionally comprising:
a gesture relative to the viewport, for the symbol, indicating the movement of the symbol relative to the viewport that is configured to disambiguate the first placement method from the second placement method.

7. The apparatus as claimed in claim 1, wherein:
the first placement method comprises an initial drag movement of the symbol relative to the viewport and the displayed content, and
a subsequent movement of the symbol relative to the viewport but without movement of the symbol relative to the displayed content.

8. The apparatus as claimed in claim 1, wherein:
the first placement method comprises an initial drag movement of the symbol relative to the viewport and the displayed content, and
a subsequent movement of the symbol relative to the viewport to a variable position that tracks the displayed content within the viewport, as the viewport moves relative to the content, to which the sound source is to be locked.

9. The apparatus as claimed in claim 8, wherein the displayed content that is tracked and to which the sound source is to be locked is first content of a visual scene.

10. The apparatus as claimed in claim 9, wherein the first content is a majority of the visual scene that forms a background.

11. The apparatus as claimed in claim 9, wherein the first content is a minority of the visual scene and comprises a visual object that moves within the visual scene.

12. The apparatus as claimed in claim 1, wherein the content displayed within the viewport is a sub-set of available content, wherein the sub-set is defined with the viewport, and wherein the viewport is defined with a point of view and a field of view, wherein one or both of the displayed content and the point of view are time-variable.

13. The apparatus as claimed in claim 1, wherein the second placement method is configured to lock the sound source to a third position that tracks with the viewport, and not the displayed content that is moving relative to the viewport as the viewport moves.

14. The apparatus as claimed in claim 1, wherein the second placement method comprises:
an initial drag movement of the symbol relative to the viewport and the displayed content, and
no subsequent movement of the symbol relative to the viewport for a threshold time period.

15. The apparatus as claimed in claim 1, wherein the viewport is a touch display screen and the symbol is a displayed icon on the touch display screen, and wherein the one or more gestures that place the displayed symbol in the displayed content are touch-based gestures.

16. The apparatus as claimed in claim 15, wherein the icon is provided in a menu displayed on the touch display screen.

17. The apparatus as claimed in claim 1, wherein the sound source and the content were recorded contemporaneously.

18. A method comprising:
displaying content within a viewport;
displaying a symbol representing a sound source within the viewport;
detecting one or more gestures that place the displayed symbol in the displayed content; and
determining whether the one or more gestures comprise a first placement method or a second placement method, wherein the first placement method comprises a placement method performed for the symbol that locks the sound source to a first position within the displayed content that moves with the displayed content within the viewport as the viewport moves, wherein the first placement method comprises at least a gesture configured to move the symbol with the displayed content, relative to the viewport, as the viewport moves, wherein the second placement method comprises a placement method performed for the symbol that is different to the first placement method and locks the sound source to a second position within the viewport that does not move with the displayed content within the viewport, wherein the second placement method comprises a gesture configured to hold the symbol at the second position within the viewport as the viewport moves,
wherein the first placement method comprises, at least, a disambiguating gesture relative to the viewport, for the symbol, indicating movement of the symbol relative to the viewport, wherein the disambiguating gesture is configured to disambiguate the first placement method from the second placement method.

19. A non-transitory computer-readable medium comprising program instructions stored thereon for performing at least the following:

displaying content within a viewport;

displaying a symbol representing a sound source within the viewport;

detecting one or more gestures that place the displayed symbol in the displayed content; and determining whether the one or more gestures comprise a first placement method or a second placement method, wherein the first placement method comprises a placement method performed for the symbol that locks the sound source to a first position within the displayed content that moves with the displayed content within the viewport as the viewport moves, wherein the first placement method comprises at least a gesture configured to move the symbol with the displayed content, relative to the viewport, as the viewport moves, wherein the second placement method comprises a placement method performed for the symbol that is different to the first placement method and locks the sound source to a second position within the viewport that does not move with the displayed content within the viewport as the viewport moves, wherein the second placement method comprises a gesture configured to hold the symbol at the second position within the viewport as the viewport moves, wherein the first placement method comprises, at least, a disambiguating gesture relative to the viewport, for the symbol, indicating movement of the symbol relative to the viewport, wherein the disambiguating gesture is configured to disambiguate the first placement method from the second placement method.

* * * * *